(12) United States Patent
Gannet et al.

(10) Patent No.: US 11,548,688 B2
(45) Date of Patent: Jan. 10, 2023

(54) FIREWOOD TRANSPORT AND STORAGE ASSEMBLY

(71) Applicants: Leonard Gannet, Morristown, NJ (US); Simon Shevelev, Wyckoff, NJ (US)

(72) Inventors: Leonard Gannet, Morristown, NJ (US); Simon Shevelev, Wyckoff, NJ (US)

(*) Notice: Subject to any disclaimer, the term of this patent is extended or adjusted under 35 U.S.C. 154(b) by 148 days.

(21) Appl. No.: 16/352,075

(22) Filed: Mar. 13, 2019

(65) Prior Publication Data
US 2020/0290773 A1    Sep. 17, 2020

(51) Int. Cl.
*B65D 30/06* (2006.01)
*B65D 85/00* (2006.01)
(Continued)

(52) U.S. Cl.
CPC ............. *B65D 29/04* (2013.01); *B65B 7/02* (2013.01); *B65D 33/105* (2013.01); *B65D 33/28* (2013.01); *B65D 85/70* (2013.01)

(58) Field of Classification Search
CPC ....... A45C 2003/002; A45C 3/04; A45C 3/05; B65D 29/00; B65D 29/04; B65D 88/16; B65D 88/1606; B65D 88/1612; B65D 88/1618; B65D 88/1625; B65D 88/1631; B65D 88/1637; B65D 88/1643; B65D 88/165; B65D 88/1656; B65D 88/1662; B65D 88/1668; B65D 88/1675; B65D 88/1681; B65D 88/1687; B65D 88/1693; B65D 88/18; B65D 88/20; B65D 88/22; B65D 88/24; B65D 29/02; B65F 2250/128
(Continued)

(56) References Cited

U.S. PATENT DOCUMENTS 4,597,189 A * 7/1986 Cutrara ................. F26B 3/04
                                                          206/497
D296,044 S   6/1988 Cody
(Continued)

FOREIGN PATENT DOCUMENTS

CN    101691152 A   4/2010
CN    205952636 U   2/2017
(Continued)

OTHER PUBLICATIONS

16352075_2021-10-06_CN_101691152_A_M (Year: 2010).*
(Continued)

*Primary Examiner* — Jes F Pascua
*Assistant Examiner* — Nina K Attel
(74) *Attorney, Agent, or Firm* — Westman, Champlin & Koehler, P.A.; Amanda M. Prose

(57) ABSTRACT

A reusable container for storage, transport, and sale of firewood. The container has a rectangular floor panel supporting a plurality of vertically disposed wall panels. The wall panels are connected at a first end to the base so as to provide a container having an open top for loading firewood into the container. One or more handles are secured to a second end of one or more wall panels and a closure mechanism is provided for closing a portion of the second end of one or more of the wall panels around the firewood in the container. The container is a reusable container.

17 Claims, 6 Drawing Sheets

(51) Int. Cl.
*B65B 7/02* (2006.01)
*B65D 33/28* (2006.01)
*B65D 33/10* (2006.01)

(58) Field of Classification Search
USPC .............. 383/117, 71–76; 47/65.8; 206/423; 294/152
See application file for complete search history.

(56) References Cited

U.S. PATENT DOCUMENTS

| | | | |
|---|---|---|---|
| 5,050,999 A * | 9/1991 | Van Loon, III | A45C 3/045 383/117 |
| 5,238,305 A | 8/1993 | Feller | |
| D655,501 S | 3/2012 | Maier | |
| D655,912 S | 3/2012 | Gerbi | |
| D655,913 S | 3/2012 | Gerbi | |
| D656,312 S | 3/2012 | Gerbi | |
| D817,636 S | 5/2018 | Maier | |
| 2007/0189642 A1 | 8/2007 | Materna | |
| 2010/0260441 A1 * | 10/2010 | Sabounjian | A45C 7/0077 383/12 |

FOREIGN PATENT DOCUMENTS

| | | |
|---|---|---|
| CN | 207174502 U | 4/2018 |
| JP | 3207275 U | 11/2016 |

OTHER PUBLICATIONS

International Search Report issued in PCT/US2020/021123, dated May 21, 2020.
Written Opinion of the International Searching Authority issued in PCT/US2020/021123, dated May 21, 2020.
NPL 1—Photograph of a prior art log enclosure published prior to to Mar. 13, 2019; retrieved during Internet search conducted on Dec. 20, 2018.
NPL 2—Photograph of a prior art log enclosure published prior to Mar. 13, 2019; retrieved during Internet search conducted on Dec. 20, 2018.
NPL 3—Photograph of a prior art log enclosure published prior to to Mar. 13, 2019; retrieved during Internet search conducted on Dec. 20, 2018.
NPL 4—Photograph of a prior art log enclosure published prior to to Mar. 13, 2019; retrieved during Internet search conducted on Dec. 20, 2018.
NPL 5—Photograph of a prior art log enclosure published prior to to Mar. 13, 2019; retrieved during Internet search conducted on Dec. 20, 2018.
NPL 6—Photograph of a prior art log enclosure published prior to to Mar. 13, 2019; retrieved during Internet search conducted on Dec. 20, 2018.
NPL 7—Photograph of a prior art log enclosure published prior to to Mar. 13, 2019; retrieved during Internet search conducted on Dec. 20, 2018.
NPL 8—Photograph of a prior art log enclosure published prior to to Mar. 13, 2019; retrieved during Internet search conducted on Dec. 20, 2018.
NPL 9—Photograph of a prior art log enclosure published prior to to Mar. 13, 2019; retrieved during Internet search conducted on Dec. 20, 2018.
NPL 10—Photograph of a prior art log enclosure published prior to to Mar. 13, 2019; retrieved during Internet search conducted on Dec. 20, 2018.
NPL 11—Photograph of a prior art log enclosure published prior to to Mar. 13, 2019; retrieved during Internet search conducted on Dec. 20, 2018.
NPL 12—Photograph of a prior art log enclosure published prior to to Mar. 13, 2019; retrieved during Internet search conducted on Dec. 20, 2018.
NPL 13—Photograph of a prior art log enclosure published prior to to Mar. 13, 2019; retrieved during Internet search conducted on Dec. 20, 2018.
NPL 14—Photograph of a prior art log enclosure published prior to to Mar. 13, 2019; retrieved during Internet search conducted on Dec. 20, 2018.

* cited by examiner

FIREWOOD TRANSPORT AND STORAGE ASSEMBLY

BACKGROUND

The present disclosure generally relates to containers for sale, storage and transport of bundles of firewood or other goods, and particularly relates to a reusable, open mesh container having a rectangular shape for the firewood or other goods carried therein.

Small bundles of firewood are typically packaged in mesh bags or wrapped in plastic sheeting for transport and retail sale. Such mesh bags are formed from a polymer mesh and are sealed at both ends with firewood secured therein. These bags are not openable without destruction of the bag. Bundles of firewood may also be sealed or wrapped in plastic sheet wrap.

Other forms of known firewood carriers include a mesh sling with an open top and two handles formed from the ends of the mesh sling, adjacent the top, and canvas or fabric-type slings with open ends, having two handles extending from the top.

Plastic mesh packaging is desired for sale, transport and storage of firewood because it is strong and allows the firewood stored therein to "breathe," thereby avoiding the possibility for the retention of water in the wood. The wood thus is more resistant to mold or rot when sold, transported and/or stored in mesh, or breathable, packaging. Wrapping firewood in plastic sheeting allows for moisture retention by the wood within the plastic.

When a handle is added to such a plastic wrap firewood package, the handle is often attached directly to the wood retained therein, with the handle being secured directly to wood within the package by nails or staples driven through the handle ends and into the wood. This adds to the inconvenience of separating the wood from such packaging. The lack of ergonomically designed handles on plastic mesh bags of firewood makes them difficult to hold and carry.

In addition, the lack of defined form that the known packaging provides to the firewood bundle makes stacking those firewood packages problematic, both from a stability standpoint, and from an efficiency standpoint. Each mesh bag secured small firewood bundle takes on a non-standard shape. This makes palletizing such misshapen firewood packaging problematic, as each pallet takes on its own three-dimensional form and requires further packaging constraints for holding the packages on the pallet, either using plastic wrap or other means. This further adds to the packaging cost of the product and, in the case of using plastic sheeting wrap, may cause undesirable moisture retention in the wood product. For shipping, it is always undesirable to "ship air" and thus the most desirable packaging eliminates air pockets and spaces between packages. Small bundles of packaged firewood that are not uniform in shape and size result in inefficient shipping practices and dimensional instability of the shipped firewood packages.

SUMMARY

An aspect of the present disclosure relates to a flexible container for securing of a load in a generally rectangular shape therein. The container has a bottom panel providing a generally horizontal base such that the container is an open top container. Two end panels and two side panels extend in an upright manner from a connection with the horizontal base and each of the end panels are contiguous with each of the side panels to form the side and end walls of the container. At edges where the panels are contiguous, and where the end and side panels are secured to the bottom panel, respective panel material is stitched together to form a seam. A drawstring is operably secured along an upper perimeter of the walls of the container closure of the open top around a load received by the container. Two handles are provided and each handle is secured to a location on the upper portion of the walls of the container. The container is comprised of an open mesh material and is configured such that closure of the open top around the load therein allows the container to take substantially the rectangular shape around the load received therein.

A further aspect of the present disclosure relates to a reusable container for storage, transport, and sale of firewood. The container has a rectangular floor panel supporting a plurality of vertically disposed wall panels. Each wall panel is connected at a first end thereof to the base so as to provide a container having an open top for loading firewood into the container. One or more handles are secured to a second end of one or more wall panels and a closure mechanism is provided for closing a portion of the second end of one or more of the wall panels around the firewood in the container. The container is a reusable container.

Another aspect of the present disclosure relates to a method of packing firewood for sale, transport or storage. One or more lengths of firewood can be loaded in a mesh container comprising a rectangular floor panel supporting a plurality of vertically disposed wall panels, each of the wall panels connected at a first end thereof to the floor panel and the container having an open top for loading the firewood into the container and wherein the container has one or more handles secured to a second end of one or more wall panels. A drawstring and closure mechanism slidable along a length of the drawstring woven through upper ends of the wall panels of the container cooperate to close the upper ends of the wall panels over the one or more lengths of firewood placed in the container to form a substantially rectangular container.

This disclosure, in its various combinations, either in apparatus or method form, may also be characterized by the following listing of items:

1. A reusable container for storage, transport, and sale of firewood, the container comprising:
    a rectangular floor panel supporting a plurality of vertically disposed wall panels, the wall panels connected at a first end to the base and the container having an open top for loading firewood into the container;
    one or more handles secured to a second end of one or more wall panels; and
    a closure mechanism for closing a portion of the second end of one or more of the wall panels around the firewood in the container, and
    wherein the container is a reusable container.
2. The container of item 1, wherein the floor panel is an open mesh construction and provides a rectangular or square base to the container.
3. The container of item 1, wherein the wall panels comprise a pair of opposing side wall panels and a pair of opposing end wall panels.
4. The container of item 3, wherein the wall panels are an open mesh construction.
5. The container of item 4, wherein the closure mechanism comprises a length of cord woven through the open mesh construction of upper ends of one or more wall panels such that a first end of the cord and a second end of the cord are outside of the container on a same wall panel of the container.

6. The container of item 5, wherein a two-way sliding lock is secured over the first and second ends of the cord and is movable along the length of the cord towards a center point of the cord to close the wall panels over a top of the firewood in the container.
7. The container of item 6, wherein the sliding lock is a spring-loaded clip.
8. The container of item 1, wherein two handles are secured to the container, the handles secured to a wall panel in a pair of opposing wall panels such that the handles are secured to opposing sides of the container.
9. The container of item 8, wherein the handles are nylon straps having a width of about ¾ inches or greater.
10. The container of item 2, wherein the container is comprised of a synthetic polymer mesh such that the container can support a load of up to 25 lbs. therein.
11. The container of item 2, wherein the container is an open mesh polypropylene container.
12. A method of packing firewood for sale, transport or storage comprising:
    placing one or more lengths of firewood into a mesh container comprising a rectangular floor panel supporting a plurality of vertically disposed wall panels, the wall panels connected at a first end to the base and the container having an open top for loading the firewood into the container and wherein the container has one or more handles secured to a second end of one or more wall panels;
    sliding a closure mechanism along a length of cord woven through a perimeter edge along the second end of the wall panels to the close the second ends of the wall panels over the one or more lengths of firewood placed in the container to form a substantially rectangular container.
13. The method of item 12, wherein the container is reusable.
14. A flexible container for securing of a load in a generally rectangular shape therein, the container comprising:
    a bottom panel providing a generally horizontal base such that the container is an open top container;
    two end panels extending upright from a connection with the horizontal base;
    two side panels extending upright from a connection with the horizontal base, wherein each of the end panels are contiguous with each of the side panels and at edges where the panels are contiguous, and where the end and side panels are secured to the bottom panel, respective panel material is secured together to form a seam;
    a drawstring operably secured along an upper perimeter formed by upper ends of the two end panels and two side panels for closure of the open-top around a load received by the container; and
    two handles, each handle being secured to the upper portion of one of an end or a side panel,
    wherein at least one of an end or a side panel of the container is comprised of an open mesh material and wherein the container is configured such that closure of the open-top around the load allows the container to take substantially the rectangular shape around the load received therein.
15. The flexible container of item 15, wherein the open mesh material comprises polypropylene.
16. The flexible container of item 15, wherein each handle is a strap comprised of nylon, and wherein terminal ends of each strap are adhered to the container.
17. The flexible container of item 15, wherein the container is reusable.
18. The flexible container of item 16, further comprising a closure mechanism operably connected to the drawstring and movable on the length of the drawstring to reduce an effective length of the drawstring thus closing the container.
19. The flexible container of item 18, wherein the closure mechanism is a spring loaded clip for two-way movement along the drawstring for opening and closing the container.
20. The flexible container of item 14 configured to receive a load of firewood weighing up to 25 lbs. for sale, transport or storage of said firewood in a generally rectangular shape.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by the like reference numerals throughout the several views. It is contemplated that all description are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

This disclosure relates to a packaging scheme for a firewood bundle that addresses the shortcoming of the packaging arrangements discussed in the Background section above. The disclosed new packaging scheme is also less wasteful in terms of packaging material, and provides a firewood carrying package that may be reused, further saving resources. Further, this packaging scheme includes a closure which allows for easy closing and opening of the bag, securing the contents therein.

Figure 1:
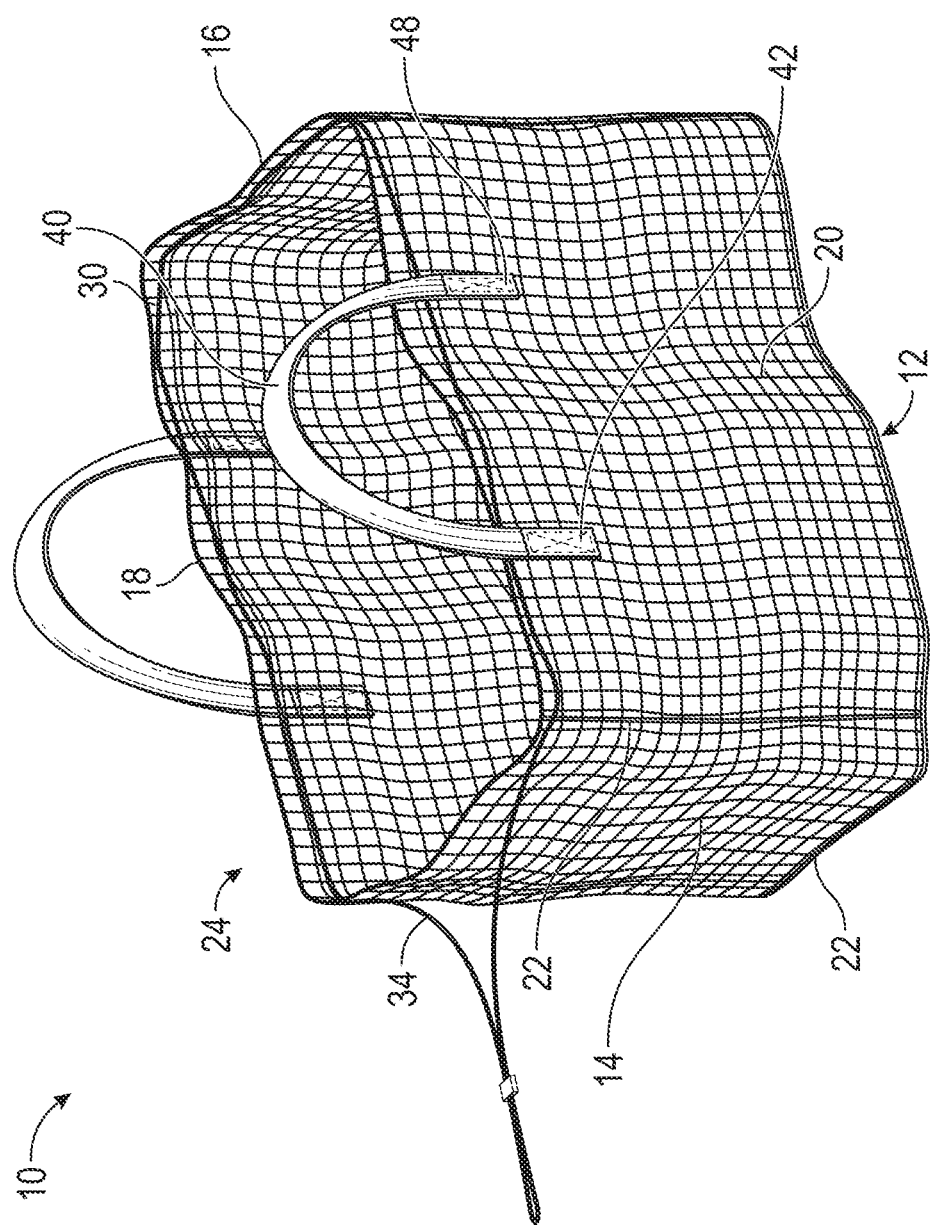
FIG. 1 is a front perspective view of an embodiment of an open top container according to the present disclosure.
Figure 2:
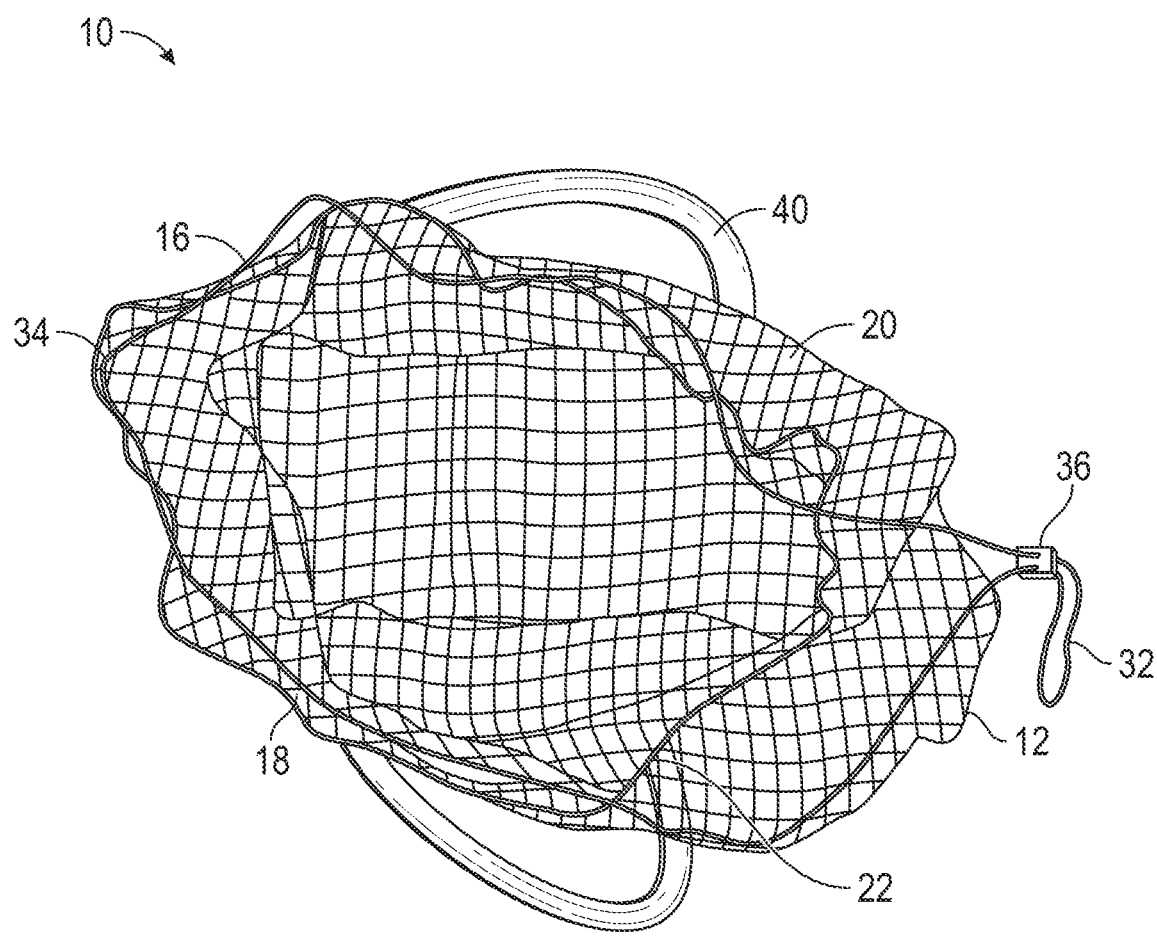
FIG. 2 is a top perspective view of the open top container of FIG. 1.
Figure 3:
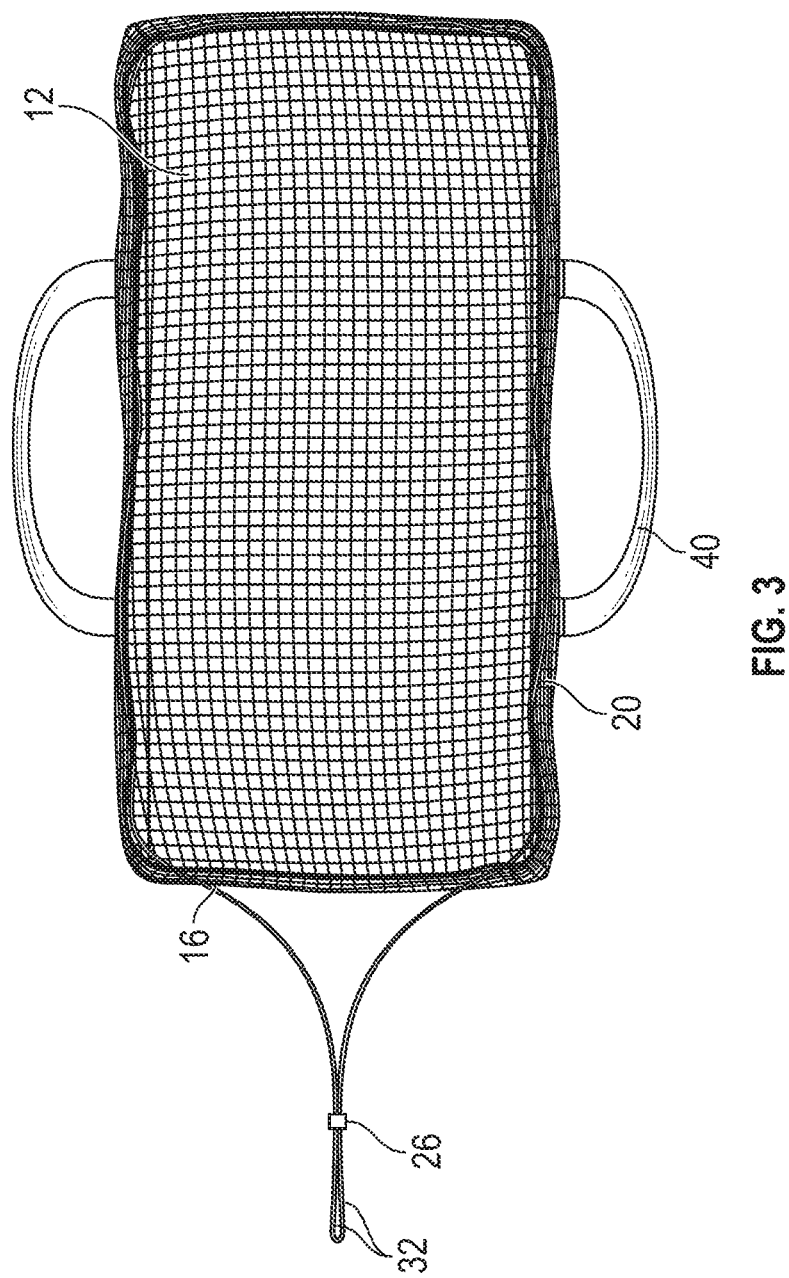
FIG. 3 is a bottom view of the open top container of FIG. 1.

In one embodiment, as illustrated in FIGS. 1-4, multiple panels of a flexible, durable, water resistant, and breathable material are stitched together along defined seams or edges to create a box-like firewood packaging container 10 and carrier for firewood. The container has a bottom panel 12, end panels 14 and 16, and side panels 18 and 20. The bottom panel 12 may provide a substantially flat base for upright or generally vertical panels 14, 16 and 18, 20. Where each panel 12, 14, 16, 18, and 20 is contiguous to another panel, there is an edge of respective panel material secured together to form a seam 22 between adjacent panels. The seams 22 may be formed by joining the respective panels by way of adhesive, heat bonding, sewing, weaving or other suitable means of securing the panels to one another. In the embodiment illustrated, the respective panel materials are sewn together with thread. This assemblage of panels 12, 14, 16, 18 and 20 thus defines an open-topped container, such as illustrated in FIGS. 1-3.

Figure 5:
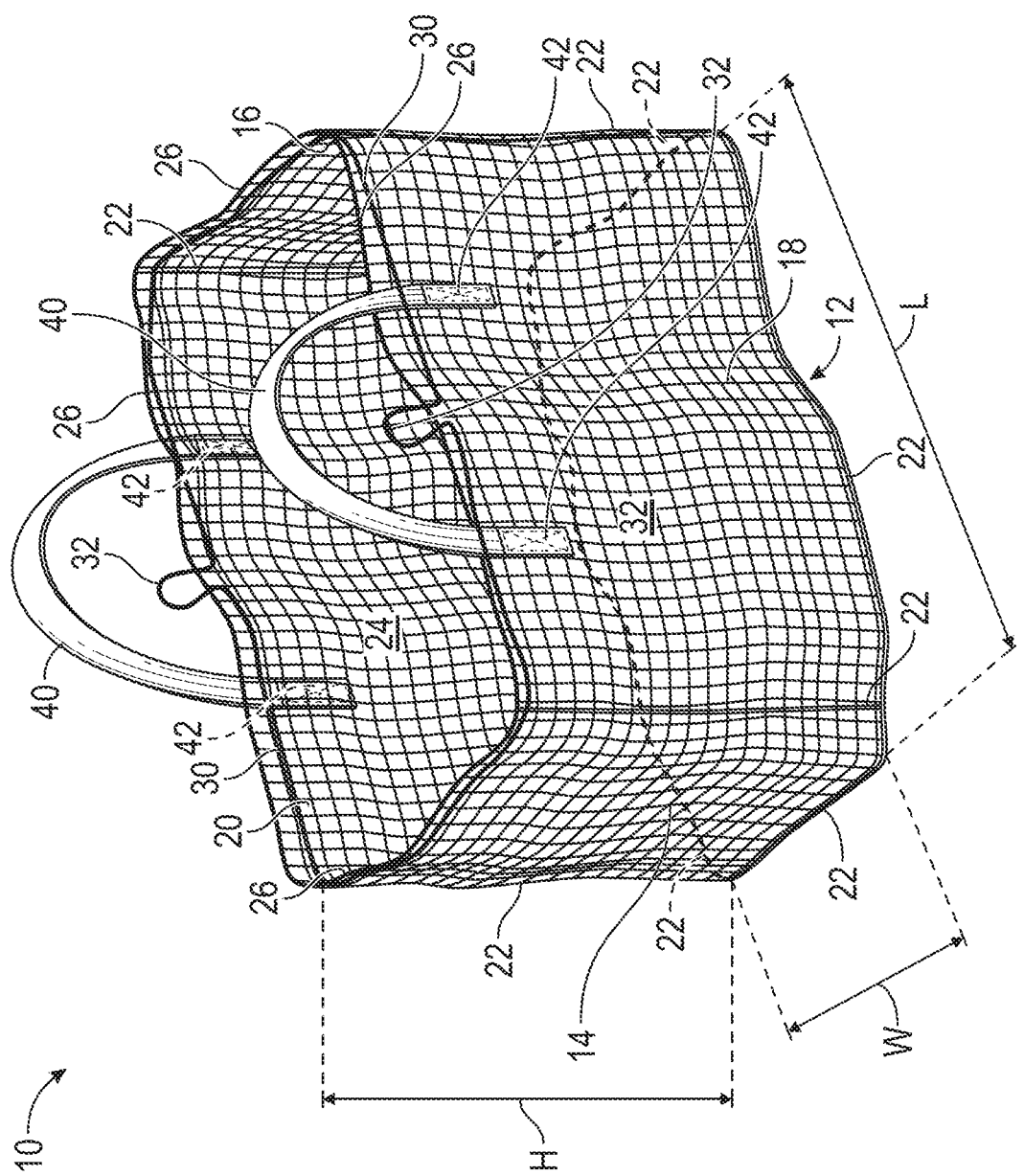
FIG. 5 is side perspective view of an additional embodiment of the open top container according to the present disclosures.
Figure 6:
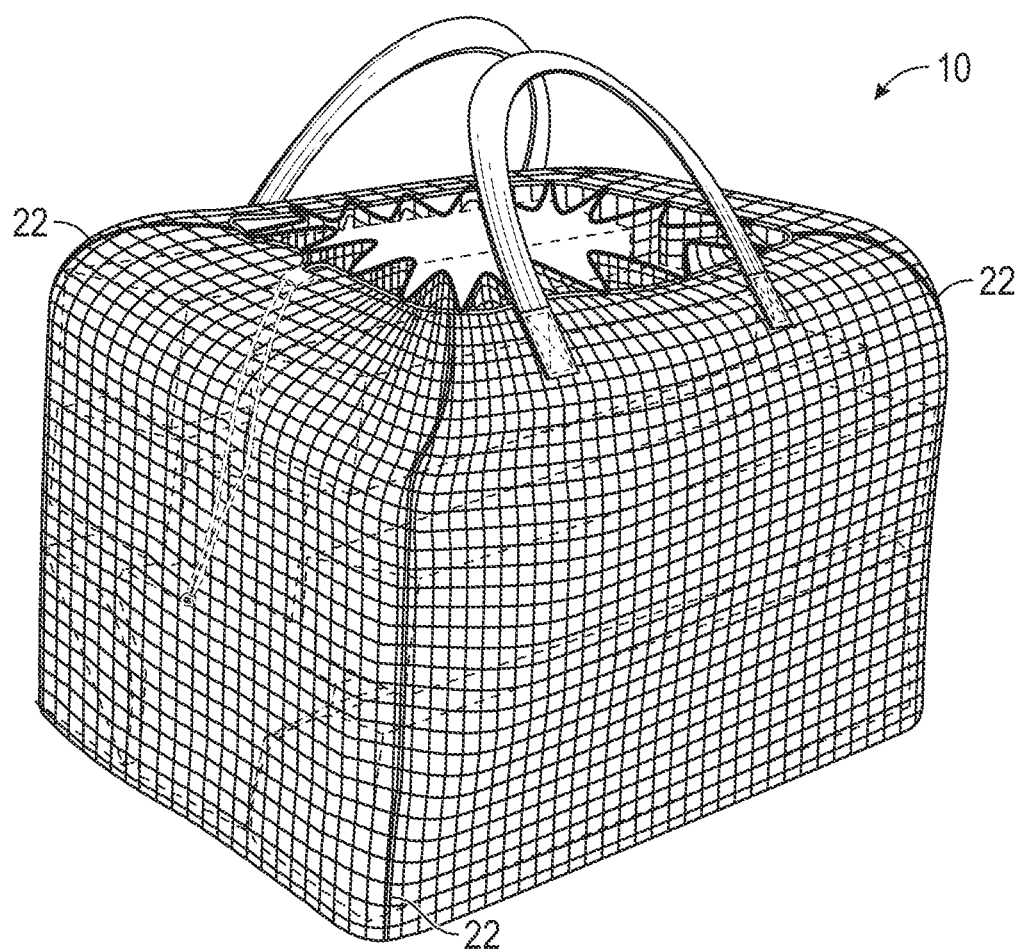
FIG. 6 is side perspective view of an additional embodiment of the open top container according to the present disclosures.

As illustrated in FIG. 5, in one embodiment, the dimensions for this container are length L ranging from about 12 inches to about 17 inches, and preferably about 15 inches, width W ranging from about 6 inches to about 10 inches, and preferably about 7.5 inches, and height H ranging from about 9 inches to 12 inches, and preferably about 10.5 inches. The container 10 is open at its top 24, opposite bottom panel 12. As illustrated in the figures, each panel is flexible, and one or more panels may be formed of an open mesh material, where each panel has seams between it and adjacent panels (seams 22 at the container edges where adjacent panels are joined together). This allows the container 10 to adapt somewhat to the shape of the load placed therein when the container 10 is closed.

As illustrated in FIG. 5, the end panels 14 and 16 and side panels 18 and 20 may be reinforced along top edges thereof adjacent the open top 24. The seams 22 may extend through these reinforced sections 26.

Figure 4:
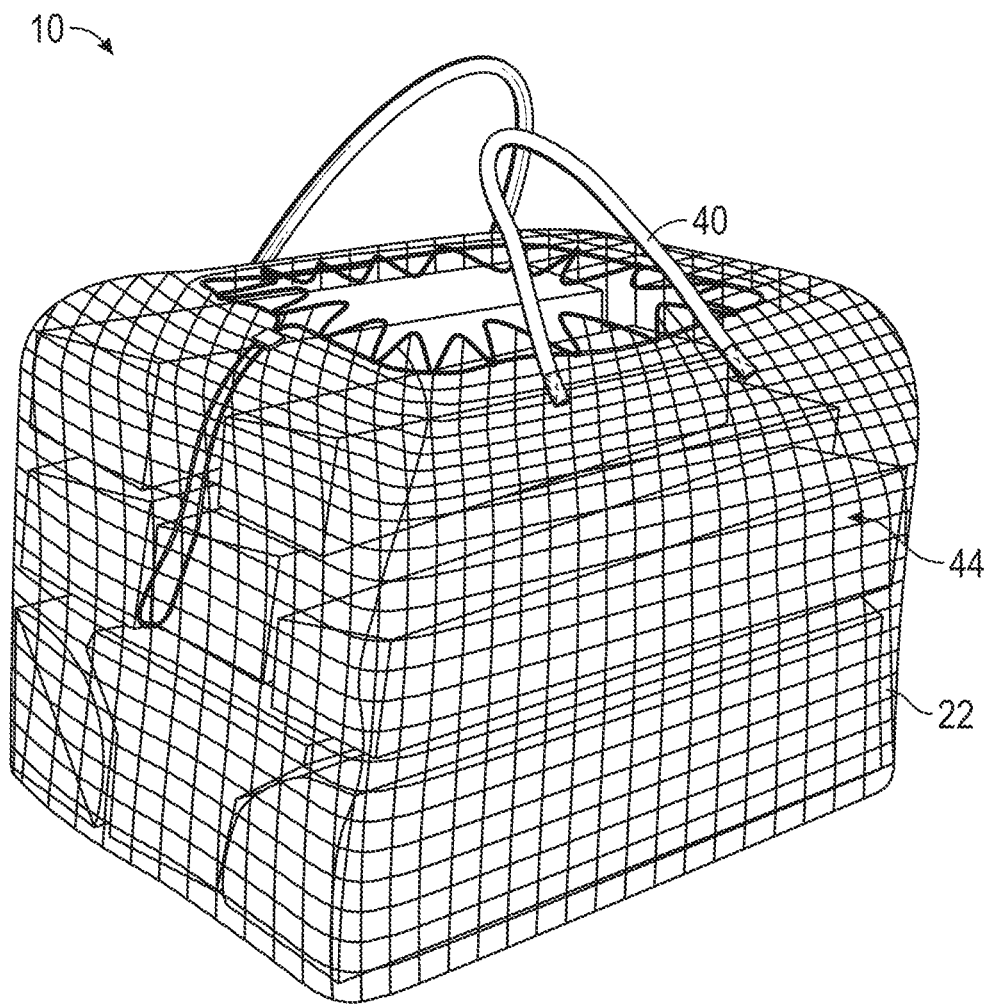
FIG. 4 is a perspective view of the open top container loaded with firewood and closed over the firewood.

A closure mechanism such as drawstring 30 is woven through some or all openings along an upper perimeter of the material at each of the end panels 14 and 16, and side panels 18 and 20. The closure mechanism 30 is an independent closing device such that the container can be opened and closed apart from the handles as the closure mechanism 30 does not double as a carrying mechanism. In embodiments where the end panels 14 and 16 and side panels 18 and 20 are reinforced, the closure mechanism 30 is woven through openings immediately below the reinforced sections 26. The drawstring 30 has opposing ends 32 which may be pulled away from the container 10 to shorten the effective length of the drawstring. This effective length may be shortened to close the open top 24 of the container 10 or otherwise secure the contents therein by sliding a closure mechanism 36 from the ends 32 of the drawstring, which are threaded through the closure mechanism 36, towards a mid-point 34 of the draw string 30 in order to "cinch" the container closed, such as illustrated in FIG. 4. The effective length can be understood as approximately the length of the drawstring behind the closure mechanism 36 such as the length drawing the panels closed over the load. Thus, an ineffective length of the drawstring is the length extending in front of the closure mechanism consisting essentially of the length of the drawstring ends 32 from the closure mechanism to terminal ends.

The closure mechanism 36 may be a one way sliding mechanism, a clip or clamp, or a two-way sliding mechanism, examples of which include but are not limited to a clamp or ring, a spring loaded clamp, a cord lock, a double hole spring loaded cord lock, or the like. The drawstring ends 32 are threaded through the closure mechanism 36 such that the closure mechanism can be selectively moved to shorten the effective length of the drawstring. The effective length can alternatively or additionally be shortened by tying off the drawstring ends such that tying the ends of the drawstring can eliminate the need for additional clips or other sliding mechanisms.

Use of the drawstring 30 effectively and adjustably reduces the size of the open top 24 of the container 10 to secure portions of the end panels 14 and 16 and side panels 18 and 20 over the top of the wood within the container 10. The bottom panel 12 provides a rectangular base to the container when filled such that the container 10 maintains a substantially flat, rectangular base when loaded with firewood or other contents loaded substantially along and across the surface area of the base panel 12. The remaining panels 14 and 16 and 18 and 20 generally are vertically disposed with respect to the connection with the base panel 12 and thus can be closed over the load, adapting to the shape of the height of the load. This construction serves to retain the wood in a pre-defined and constrained shape and configuration, as defined by the panels 12, 14, 16, 18 and 20 and their respective seams 22, which is generally rectangular and box-like in configuration. As illustrated in FIG. 4, the shape of the container 10 when the drawstring 30 is pulled to a closed configuration thereby defines a generally rectangular prism-shaped small bundle of firewood 44 for transport and storage. This facilitates the stacking of such filled firewood containers 10 on pallets or at retail distribution outlets in an orderly and efficient manner.

The container 10 is constructed from panels 12, 14, 16, 18, and 20 of a flexible, somewhat stretchable and resilient, durable, water resistant material with an open mesh construction. That is, one or more of the panels are comprised of a material having an open mesh size of about 7 or greater on the US standard Mesh scale. The material may be comprised of a polymer resin provided in thread or filament form and where one or multiple, for example three, strands of this thread or filament are used to form the open mesh construction of each panel. While each of the panels 12, 14, 16, 18, and 20 can be constructed of the same material, one or more panels may be constructed of a second material, wherein the second material is a non-mesh material.

In the embodiment illustrated, the panels 12, 14, 16, 18, and 20 are constructed of a thread comprising one or more strands of polypropylene, such that each panel 12, 14, 16, 18, and 20 can be considered an open mesh polypropylene panel. As illustrated, the panels 12, 14, 16, 18, and 20 are constructed in a knit, woven, net, or mesh manner such that the openings are square or rectangular in shape, having a width and a length in the range of about ⅛ inch to about ¼ inch when the container 10 is in a relaxed or open condition as illustrated in FIGS. 1-3 and 5. The dimensions of the mesh may be enlarged to a limited degree when the container 10 is closed as illustrated in FIG. 4. Further, larger and smaller dimensions for the openings are contemplated and within the scope of the disclosure as long as the openings are of a size sufficient to allow for permeation of sufficient air through the container 10 to allow the firewood 44 to breathe while holding the firewood 44 stably in place.

The seams 22 provide an additional strength and reinforcement to the container 20 that increases when a load is received therein. As one or more panels 12, 14, 16, 18, and/or 20 stretch as a load is received therein, the seams are tightened providing for additional reinforcement to the container 10. For example, as one or more panels are an open mesh material comprised of polypropylene, each panel is capable of stretching up to about 20% and more preferably up to about 15%, and more preferably still up to about 10% of its relaxed length in one or both of a direction along the length of the seam 22 and a direction transverse to the seam 22 when weight such as firewood or other goods are placed in the bag. The knit construction of the open mesh panels allows each panel to stretch in one or both directions based on orientation of the mesh. When two contiguous panels 12, 14 16, 18, or 20 are stretched the corresponding seam/s 22 is/are pulled taught and strengthen the corresponding bonding of the panels, up to a weight of about 25 lbs. placed in the container 10.

Since the container 10 is made of an open mesh polymer fabric, the firewood 44 therein is allowed to breathe, and moisture retention is virtually nonexistent. Typically, firewood 44 sold at retail is cut into lengths of about 15 inches. Preferably, firewood 44 is filled in the container 10 to a level of about 9 inches, so that when the drawstring is pulled and the effective length of its drawstring is shortened as shown in FIG. 4, the small bundle of firewood 44 has an approximate dimensional form of a rectangular shape of about 15 inches long, about 9 inches wide, and about 9 inches high. The container then is readily stackable with like containers for palletization, storage, and delivery. Each such filled container thus typically weighs from about 20 lbs. to about 25 lbs. (assuming the wood is dry). The container described herein can support up to about 25 lbs. carried therein, and up to approximately 2 cubic feet of a load therein. In the embodiment illustrated the approximate dimensional form of the rectangle may be about one cubic foot or less.

For ease in transport of each container 10 of firewood 44, two handles are secured to the side panels 18 and 20 of the container 10, such as handles 40 illustrated in FIGS. 1-3 and 5. The handles are independent from the closure mechanism 30 such that the handles provide a separate mechanism for carrying the container 10. Each handle is preferably formed from a suitably strong material, examples of which include but are not limited to a length of nylon strap material, and is affixed to its respective side panel below its upper perimeter and drawstring 30 by suitable means, such as being stitched thereto adjacent strap ends 42 or being otherwise secured thereto by adhesive or other suitable means. The handles 40 may have a width of greater than about ¾ inch and more preferably the width may be in the range of about 1 inch to 2 inches.

Once a small bundle of firewood 44 has been loaded into the container 10, and the drawstring 30 drawn tight for closure such as illustrated in FIG. 4, the handles 40 provide an ergonomic, readily accessible, and easy-to-use means for transporting the container 10, either by wholesalers, retailers, or the end consumer. The width of the handles 40 along with the shape of container allows a user to comfortably lift and carry the container with up to about 25 lbs. of firewood 44 therein without the handles 40 causing irritation or damage to the hands.

A package of a small bundle of firewood 44 packaged such as illustrated in FIG. 4 may be purchased from a retailer by a consumer and is thus readily transportable to the consumer's home. There, the firewood 44 can be carried inside the home by use of the container 10 or otherwise retained for future use. Once the firewood 44 within the container 10 has been consumed by the consumer, the container 10 can be reloaded with firewood 44 by the consumer for further transport between a firewood storage area and the consumer's home, e.g., fireplace or otherwise.

The container described herein reduces the amount of petroleum required when compared to known devices for the sale, transport, and/or storage of goods such as firewood. In known firewood container packaging, the manufacturing requires more petroleum to form the 24"×42" 3 mil plastic sheeting wrapped around said bundles and this plastic sheeting is not reusable, it is destroyed and discarded when opened.

Although the embodiment illustrated herein is directed to use of the container for the sale, transport, and storage of firewood, the container may be used in the transport of various goods and benefit from the advantages of its construction. The container 10 is lightweight, reusable, and when use is no longer desired, disposable. The handles make the container 10 ergonomic and balance the load of the contents within the container 10 in a comfortable manner for carrying by the user. Because the entire container 10 is formed of polymer open mesh material, the container 10 is breathable, does not retain moisture, and thus is beneficial for storage, retention, and transport of the various contents therein so long as those items have a dimension larger than the openings formed by the mesh material. The container 10, because of its large open top 24, is also easily loaded with large or oddly shaped objects, including but not limited to firewood, either during the initial loading thereof or reloading when reused. The drawstring 30 is also reusable to secure each further load retained within the container 10. The drawstring 30 also allows the container 10 to maintain control of the load therein if the container 10 is tipped over or dropped and prevents the contents therein from spilling out.

Although the present disclosure has been described with reference to preferred embodiments, workers skilled in the art will recognize that changes may be made in form and detail without departing from the spirit and scope of the disclosure.

The invention claimed is:

1. A reusable container for storage, transport, and sale of dry firewood, the container comprising:
    a rectangular floor panel supporting vertically disposed wall panels, the vertically disposed wall panels each connected at a first end to the rectangular floor panel and the container having an open top for loading firewood into the container;
    one or more handles secured to a second end of one or more of the vertically disposed wall panels; and
    a closure mechanism for closing a portion of the second end of one or more of the wall panels around the dry firewood in the container,
    wherein each of the vertically disposed wall panels and the rectangular floor panel are each a synthetic polymer open mesh fabric in construction, each with a mesh size of about 7 or greater on the US standard Mesh scale;
    wherein each of the vertically disposed wall panels and the rectangular floor panel is stretchable up to about 20% of its relaxed length in one or both of a direction along a length of a seam joining adjacent wall panels and a direction along a length of a second seam joining said wall panel to the floor panel, when the dry firewood is placed in the container; and
    wherein the container has dimensions to support the dry firewood load therein without destruction of the container when loading or unloading the dry firewood load for and after use and wherein the container is constructed such that a weight of the dry firewood load stretches the wall panels and the rectangular floor panel to square the dry firewood load to the rectangular shape of the container.

2. The container of claim 1, wherein the wall panels comprise a pair of opposing side wall panels and a pair of opposing end wall panels.

3. The container of claim 1, wherein the closure mechanism comprises a length of cord woven through the open mesh construction of the second ends of the vertically disposed wall panels such that a first end of the cord and a second end of the cord are outside of the container on a same one of the vertically disposed wall panels of the container.

4. The container of claim 3, wherein a two-way sliding lock is secured over the first and second ends of the cord and is movable along the length of the cord towards a center point of the cord to close the wall panels over a top of the firewood in the container.

5. The container of claim 4, wherein the sliding lock is a spring-loaded clip.

6. The container of claim 1, wherein the one or more handles comprises two handles secured to the container, the two handles secured to a pair of opposing wall panels of the vertically disposed wall panels such that the two handles are secured to opposing sides of the container.

7. The container of claim 6, wherein the handles are nylon straps having a width of about ¾ inches or greater.

8. The container of claim 1, wherein the synthetic polymer open mesh fabric can support a load of up to 25 lbs. therein.

9. The container of claim 1, wherein the synthetic polymer open mesh fabric is constructed from polypropylene.

10. A method of packing firewood for sale, transport or storage comprising:
   placing one or more lengths of dry firewood into a mesh container having dimensions to support up to approximately 2 cubic feet of a dry firewood load therein and comprising a rectangular floor panel supporting a plurality of vertically disposed wall panels, the wall panels connected at a first end to the rectangular floor panel, wherein a seam connects at least one of the plurality of vertically disposed wall panels to the rectangular floor panel and wherein a seam connects at least two adjacent wall panels of the plurality of vertically disposed wall panels to each other, and the container having an open top for loading the firewood into the container and wherein the container has one or more handles secured to a second end of one or more of the wall panels;
   wherein one or more of the plurality of vertically disposed wall panels and the rectangular floor panel are a synthetic polymer open mesh fabric in construction with a mesh size of about 7 or greater on the US standard Mesh scale;
   stretching one or more of the plurality of vertically disposed wall panels in one or more directions and up to about 20% of a corresponding relaxed length around the one or more lengths of dry firewood placed into the container such that the container squares the lengths of dry firewood to a shape of the container; and
   sliding a closure mechanism along a length of cord woven through a perimeter edge along the second end of the wall panels to the close the second end of the wall panels over the one or more lengths of dry firewood placed in the container to form a substantially rectangular container.

11. The method of claim 10, wherein the container is reusable.

12. A flexible container for securing of a load in a generally rectangular shape therein, the container comprising:
   a bottom panel providing a generally horizontal base such that the container is an open top container, wherein the bottom panel is constructed of a polymer open mesh fabric construction that allows the bottom panel to stretch along a length and/or a width of the bottom panel up to about 20% from a corresponding relaxed bottom panel length and/or width;
   two end panels extending upright from a connection with the horizontal base, wherein the two end panels each have the polymer open mesh fabric construction that allows the two end panels to stretch along a length and/or a width of each panel up to about 20% from a corresponding relaxed end panel length and/or width;
   two side panels extending upright from a connection with the horizontal base, wherein each of the two end panels are contiguous with each of the two side panels, wherein at edges where the panels are contiguous, and where the two end and two side panels are secured to the bottom panel, respective panel material is secured together to form a seam, wherein the two side panels each have the polymer open mesh fabric construction that allows the two side panels to stretch along a length and/or a width of each panel up to about 20% from a corresponding relaxed side panel length and/or width and wherein stretching of the side panels reinforces the respective seam;
   a drawstring operably secured along an upper perimeter formed by upper ends of the two end panels and two side panels for closure of the open-top around the load received by the container; and
   two handles, each handle being secured to the upper ends of one of the two end panels or one of the two side panels,
      wherein at least one of the two end panels and at least one of the two side panels of the container are comprised of the polymer open mesh fabric material with a mesh size of about 7 or greater on the US standard Mesh scale and wherein the container is configured such that closure of the open-top around the load allows the container to take substantially the rectangular shape around the load received therein and wherein the container is reusable as the container is not destroyed after being closed around the load.

13. The flexible container of claim 12, wherein the polymer open mesh fabric material comprises polypropylene.

14. The flexible container of claim 13, wherein each handle is a strap comprised of nylon, and wherein terminal ends of each strap are adhered to the container.

15. The flexible container of claim 14, further comprising a closure mechanism operably connected to the drawstring and movable on a length of the drawstring to reduce an effective length of the drawstring thus closing the container.

16. The flexible container of claim 15, wherein the closure mechanism is a spring loaded clip for two-way movement along the drawstring for opening and closing the container.

17. The flexible container of claim 12 configured to receive a load of firewood weighing up to 25 lbs. for sale, transport or storage of said firewood in a generally rectangular shape.

* * * * *